UNITED STATES PATENT OFFICE.

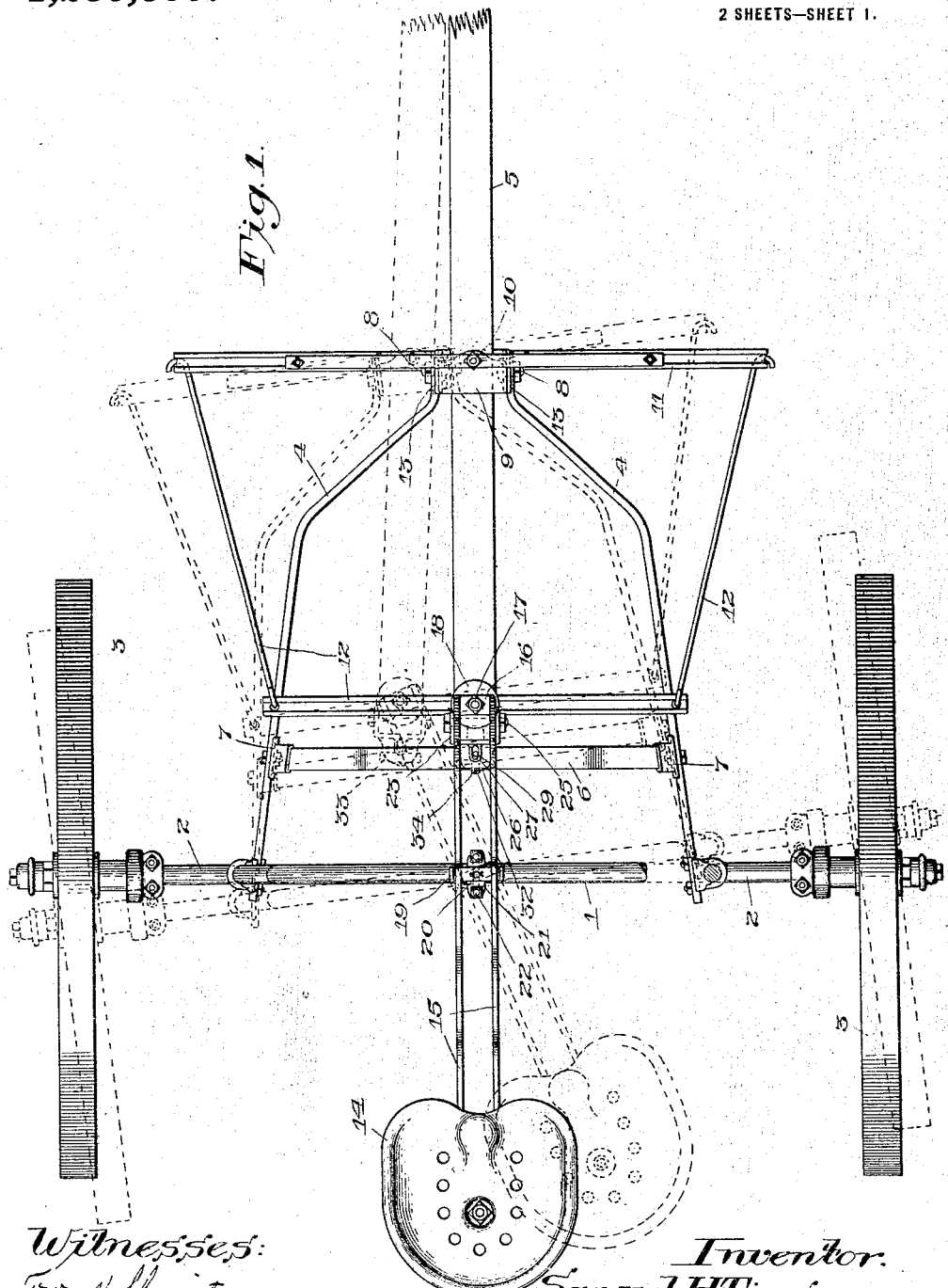

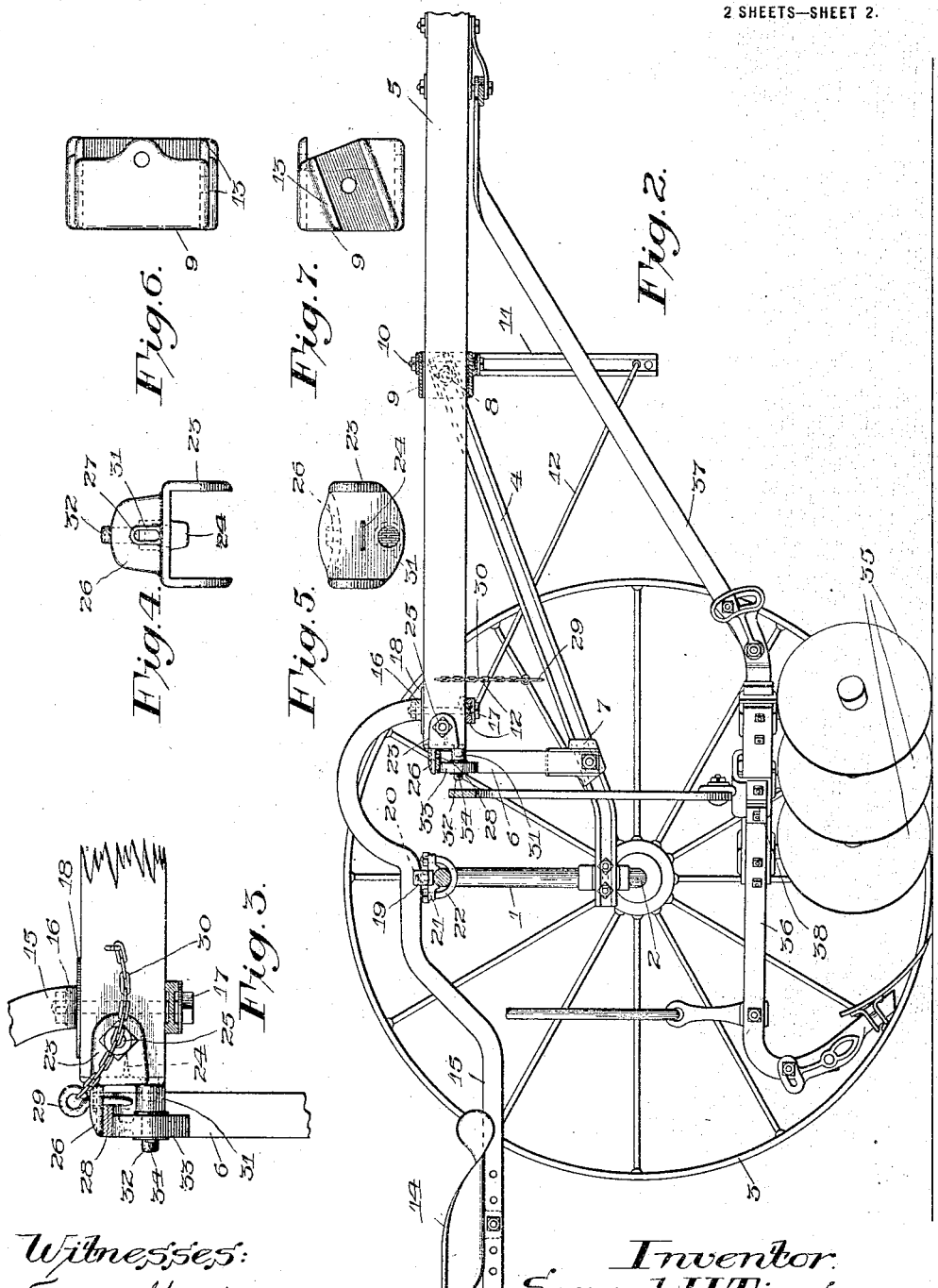

SAMUEL H. TINSMAN, OF MORRIS, ILLINOIS, ASSIGNOR, BY MESNE ASSIGNMENTS, TO INTERNATIONAL HARVESTER CORPORATION, A CORPORATION OF NEW JERSEY.

STEERING MECHANISM FOR TILLAGE IMPLEMENTS.

1,230,539.  Specification of Letters Patent.  Patented June 19, 1917.

Application filed March 13, 1913. Serial No. 753,952.

*To all whom it may concern:*

Be it known that I, SAMUEL H. TINSMAN, a citizen of the United States, residing at Morris, in the county of Grundy and State of Illinois, have invented certain new and useful Improvements in Steering Mechanisms for Tillage Implements and the like, of which the following is a full, clear, and exact specification.

My invention relates to tillage implements.

It has for its object to adjust the implement with respect to the line of draft in an improved manner. A further object of my invention is to enable the operator riding on the implement to readily adjust the wheels and frame of the implement angularly while riding on the machine. I attain these objects by pivoting the implement tongue upon the frame and pivotally connecting the seat of the implement thereto in such a manner as to enable the operator, by movement of the seat, to change the angular position of the wheels and frame at will.

In order that my invention may be clearly and fully disclosed, I have illustrated one embodiment of the same in the accompanying drawings, wherein I have shown my invention as applicable to use in connection with a riding cultivator. It is to be understood, however, that the embodiment thereof shown herein is susceptible of modification and adaptation to other uses.

Figure 1 is a top plan view of a cultivator frame with the seat and tongue shown in a plurality of positions, and the cultivator gangs omitted to facilitate clearness of illustration;

Fig. 2 is a sectional view of the construction shown in Fig. 1, and showing, in addition, one of the cultivator gangs;

Fig. 3 is a detail view, partially in section, of the connection between the rear end of the tongue and the frame;

Fig. 4 is a top plan view of one of the tongue castings;

Fig. 5 is an end view of the same;

Fig. 6 is a top plan view of another of the tongue castings;

Fig. 7 is a side elevation of the same.

The construction shown, when broadly considered, comprises a wheeled cultivator frame provided with a pivoted pole or tongue, the inner end of which is operatively connected to the supports of a seat, likewise pivoted upon the frame; the improved manner of supporting and adjusting the tongue and seat being hereinafter described.

The frame shown is of the type described in my copending application Serial No. 752,170, filed March 5th, 1913, and comprises a substantially U-shaped member 1, having horizontally disposed axles 2 on its lower extremities on which transport wheels 3 are rotatably mounted. Near the vertically extending portions of this member 1 supplemental frame members 4 are provided which extend toward the front of the cultivator and are there brought together and attached to the pole 5 thereof. In order to strengthen the parts and coöperate with the adjusting mechanism, as hereinafter described, a substantially U-shaped transversely extending member 6 is provided intermediate the ends of the members 4 and fixed at its lower ends to these members by any suitable brackets 7.

The pole or tongue 5 is fixed to the front end of the frame members 4 by bolts 8 and a casting 9. As shown in Figs. 1 and 6, this casting 9 is rectangular in cross section and of slightly greater width than the width of the tongue, so that the latter is freely movable angularly therein in a horizontal plane about a vertically extending pivot pin 10. As shown in Figs. 1 and 2, the lower end of this bolt may also be attached to suitable depending draft connections 11 connected in the usual manner through a suitable equalizer connection 12. Further, as shown in Figs. 1 and 7, a pair of angularly disposed lugs 13 may be provided upon each side of the member 9 in order to rigidly position the ends of the frame members 4 with respect thereto.

A seat 14, of any desired construction, is carried at a point back of the frame member 1 and fixed to the rear end of the pole 5 by suitable longitudinally extending supports 15. These supports 15 are preferably formed in one piece and are arranged parallel to each other. As shown in Fig. 2, these supports are also slightly curved intermediate their ends, and the seat is made adjustable longitudinally thereon so that the same may be brought to the proper level with respect to the tongue and may be adjusted longitudinally thereof to accommodate operators of different weights. As also shown in Fig. 2, the front ends of these supports 15 are flattened at 16 and fixed to the rear end of the tongue by a laterally extending pin or bolt 17 connected at its lower end to the equalizer connection 12; a suitable wearing plate 18 being provided intermediate the flattened portions 16 and the pole to alleviate the wear upon the latter caused by the angular movement of the tongue and seat. As shown in Figs. 1 and 2, the members 15 are also connected intermediate their ends by a U-shaped bracket 19, which extends upward on the opposite side of the same and is swivelly connected at 20 to a casting 21 fixed to the upper part of the member 1 by a U-bolt 22 in such a manner that the supports 15 and the seat 14 are freely rotatable about the pivot 20 on the member 1.

The engagement between the U-shaped bracket 19 and the members 15 is such that the latter are permitted to slide longitudinally thereon, so that thereby the seat may be swung a great distance to either side to deflect the tongue without any locking effect being present to intervene and limit the lateral swing.

Upon its inner end the tongue 5 is provided with a casting 23. This casting 23 is preferably driven on the end of the tongue (Fig. 3) so that an inwardly projecting wedge 24 on its end coöperates with a transversely extending bolt 25 in holding the same in position thereon. As shown in Fig. 3, the rear end of the casting 23 is provided with a horizontally disposed lip 26 extending across its upper edge, having a longitudinally disposed slot 27 therein (Fig. 4) which, when the tongue is moved about its pivot 10, is adapted to slide over the upper surface of the frame brace 6 and have its slot 27 register with a hole 28 in the member 6 when the seat and pole are in alinement, and, if desired, be locked in that position by a pin 29 attached to the pole by a flexible connection or chain 30. Beneath this lip 26 a rearwardly projecting stud or lug 31 is also preferably provided on the casting to support the spindle 32 of a roller 33 and suitably space the latter from the end wall of the casting so that the roller may rotate freely in engagement with the under surface of the frame brace 6 as the lip 26 moves over its upper surface. In order to prevent the loss of the roller, it is suitably positioned upon its spindle by a cotter pin 34.

It is to be understood that I may use any desired construction of ground tilling members with my improvement. In Fig. 2 I have shown one form of the same wherein a plurality of disks 35 are carried upon gang members 36 and dragged beneath the cultivator frame by a pivoted draft connection or link 37 pivoted to the pole at a point beyond the draft connections 11. As shown in that figure, a suitable foot rest 38 is provided upon each gang member so that the elevation of the tilting members may be varied at will. Further, these disks may be adjusted vertically through any suitable mast connection 39, illustration of which has been omitted herein, as it forms no part of this invention.

The operation of the construction shown is as follows: Let us assume that, while the implement is being drawn along a row, the operator desires to deflect the wheels 3 to the right or left. In my improved construction he is enabled to change the course of the wheels, and therefore of the frame and gang members, by moving the seat 14. For instance, let us assume that it is desired to divert the wheels from the position shown in Fig. 1 to the left. To do this the operator turns the seat 14 to the dotted line position shown in that figure, swinging the same about its pivot on the frame 1 through the pivotal connection of the seat to the pole 5, and throwing the frame and wheels toward the left. Obviously, if the operator desired to throw the wheels to the right, it would only be necessary to reverse the movement of the seat. It is to be noted that the operator is enabled to change the position of the seat and wheels very readily by placing his foot upon one or the other of the foot rests 38 carried on the gang members, and that, by doing so, he is enabled to obtain such a leverage as to swing the seat very readily about its pivot and simultaneously throw the gang members in the same direction as the wheels. As one end of the tongue 5 moves transversely of the frame, the roller 33 thereon obviously rotates in engagement with the under side of the frame brace 6, and the lip 26 upon the casting 23 obviously slides over the upper surface of this brace; any excess travel of the same being prevented by engagement with the arms of the U-shaped brace. Obviously, should the operator at any time desire to rigidly connect the tongue and seat, he may readily do so by simply slipping the pin 29 through the slot 27 of the casting when the latter is in register with the hole 28 in the frame brace 6. In this connection it is to be noted that, by the provision of an elongated slot, the pin will readily register with this hole even should it become bent in service.

While I have described one form of my invention in this application, it is to be understood that the embodiment shown herein for purposes of illustration may be modified without departing from the spirit of my invention.

What I claim as my invention, and desire to secure by Letters Patent, is:

1. In a tillage implement, a wheeled axle, a frame thereon, a tongue pivoted on said frame, a seat support pivoted to said tongue, and a pivotal connection between the seat support and the axle, comprising a bracket with projections to slidably receive the seat support and a swiveled connection between the bracket and axle.

2. In a tillage implement, a wheel carrying axle, a frame thereon, a tongue pivoted to the front end of the frame, a rearwardly extending roller carried upon the rear end of said tongue to rotatably engage with a transverse portion of the frame, and a seat support pivoted to said tongue in front of the roller and having a pivotal connection with the axle, said pivotal connection comprising a bracket with projections to slidably receive the seat support and a swiveled connection between the bracket and axle.

3. In a tillage implement, a wheeled axle, a frame thereon, a tongue pivoted to the front end of the frame and projecting rearwardly, a seat support pivoted to the rear end of the tongue in front of the axle, and a pivotal connection between the seat support and the axle, comprising a U-shaped bracket to slidably receive the seat support and a swiveled connection between the bracket and axle.

In testimony whereof I affix my signature, in the presence of two witnesses.

SAMUEL H. TINSMAN.

Witnesses:
F. W. HOFFMEISTER,
H. L. ROCKWEL.

Copies of this patent may be obtained for five cents each, by addressing the "Commissioner of Patents, Washington, D. C."